July 5, 1932.  C. S. BRAGG ET AL  1,865,505
VACUUM BRAKE SYSTEM FOR AUTOMOTIVE VEHICLES
Filed June 11, 1930  3 Sheets-Sheet 1

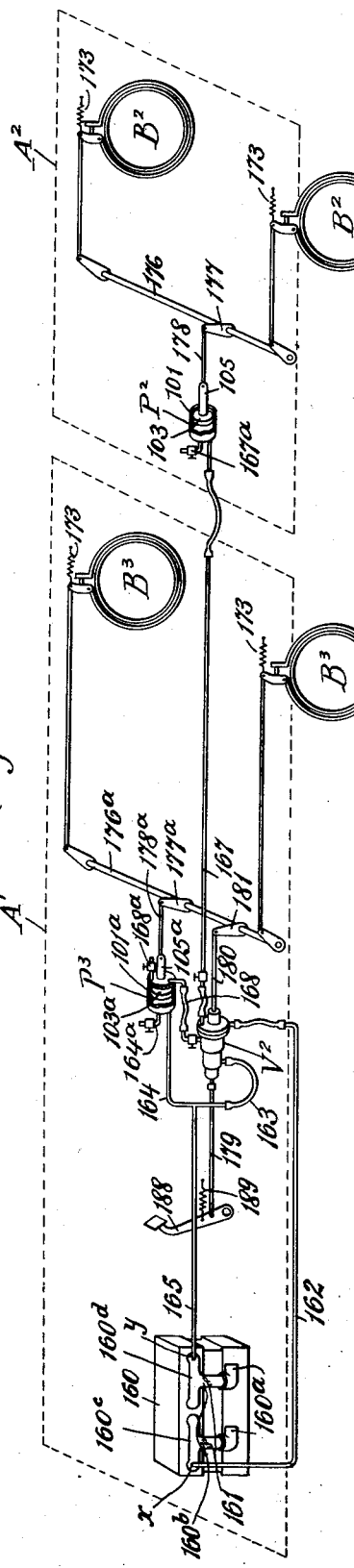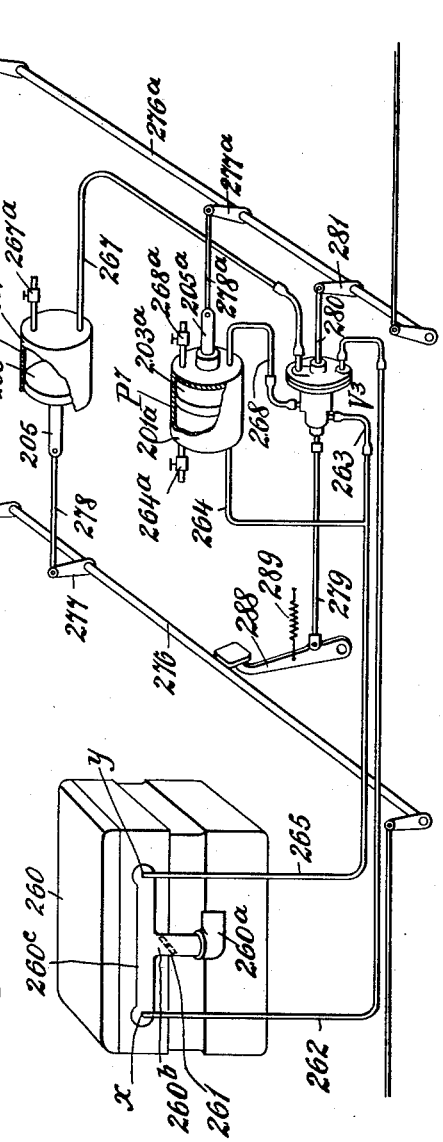

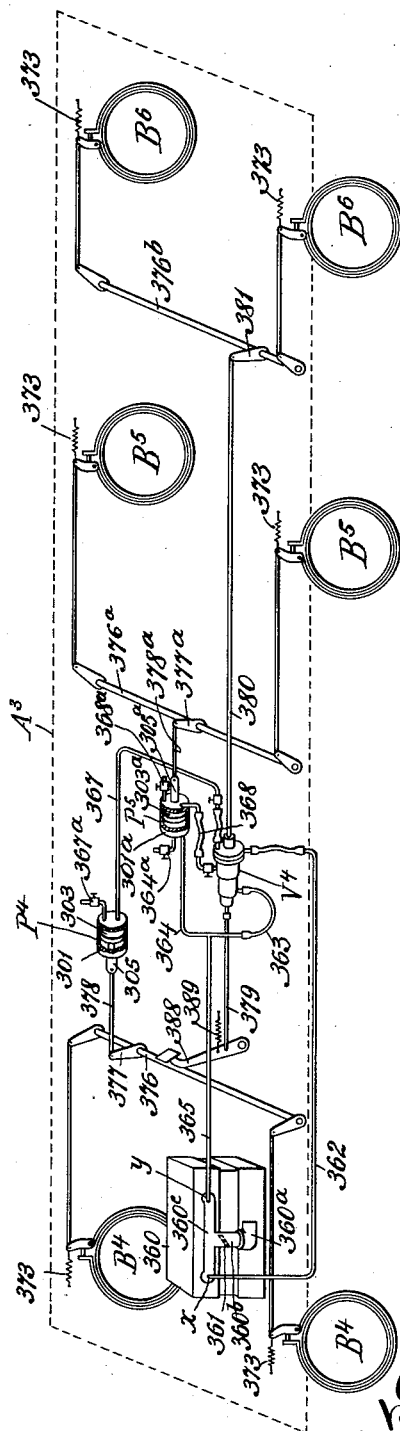

Patented July 5, 1932

1,865,505

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

VACUUM BRAKE SYSTEM FOR AUTOMOTIVE VEHICLES

Application filed June 11, 1930. Serial No. 460,334.

Our invention consists in the novel features hereinafter described, reference being had to the accompanying drawings which show several embodiments of the invention selected by us for purposes of illustration, and the said invention is fully disclosed in the following description and claims.

Our present invention is a vacuum brake system for automotive vehicles in which a partial vacuum is conveniently obtained from the suction passage, or passages, of the internal combustion engine, which drives the vehicle. A partial vacuum at approximately twenty inches of mercury on the vacuum gauge, at sea level, will ordinarily exist in such suction passage, or passages, when the throttle valve or valves controlling the same, is or are in closed position, which is the usual position of throttle valves when braking is desired. The higher pressure fluid for operating the power actuated means for the brake mechanism is ordinarily and most conveniently atmospheric air, which, operating against the maximum partial vacuum, will give a differential of fluid pressures of substantially ten pounds per square inch.

In carrying out our present invention we employ two different types of power actuators, each comprising two movable parts, as a cylinder and piston, either of which may be movable with respect to the chassis. In one of these types, which we call for convenience the "air balanced" or "pressure balanced" type, the cylinder is open at one end, to the atmosphere at all times, and is closed at the other end. The piston is normally submerged in air at atmospheric pressure when in the released position, and is moved to apply the brakes by withdrawing the air from the closed end of the cylinder. The piston is released by admitting air to the closed end of the cylinder. In the other type referred to, which is termed the "vacuum balanced" type, the cylinder is closed at both ends. In the released position of the piston, both ends of the cylinder are connected with the suction passage, maintaining the piston submerged in vacuum. The piston is moved forward to apply the brakes by admitting air to the cylinder in rear of the piston without admitting any appreciable quantity of air to the suction passage, and the brakes are released by withdrawing the air previously admitted to the cylinder in rear of the piston. When air is withdrawn from actuators of either type into the suction passage or passages of the engine, it would obviously have a tendency to dilute the explosive mixture supplied by the carburetor, and impair the efficiency of the engine, and possibly stall it if idling, were it not for the fact that in the normal operation of internal combustion engines using liquid fuel, a certain quantity of liquid fuel is deposited or collects on the walls of the suction passage. The air admitted from the the power actuator or actuators into the suction passage when the throttle valve is closed, or partially closed, to produce subatmospheric condition, will expand and come in contact with the walls of the suction passage and will absorb deposited liquid fuel therefrom, and combine with the explosive mixture passing to the engine cylinders from the carburetor so as to continue and slightly increase the operation of the motor while idling, provided said air is not admitted too rapidly to expand and absorb the deposited liquid fuel or is not admitted after the deposited liquid fuel has been absorbed. Whenever this surplus liquid fuel has been absorbed, further quantities of unfuelized air will so dilute the explosive mixture from the carburetor as to cause the motor to stall if idling. The period which is required for the explosive mixture to deposit additional liquid fuel on the walls of the suction passage will determine the intervals at which unfuelized air may be admitted to the suction passage from a suction actuated device, without stalling the engine if idling.

The general use in heavier vehicles of internal combustion engines of 6, 8, 12 and 16 cylinders each has resulted in the use of one long intake manifold or two or more shorter intake manifolds, but in either case there is more manifold length and more area of manifold walls upon which liquid fuel is deposited or collects from the explosive mixture passing from the carburetor to the engine cylinders, and consequently air admitted to either end of the intake manifold from suction actuated devices will be drawn into the adjoining cylinders of the engine only and will not pass into all of the engine cylinders nor through all of the intake manifold. In entering the intake manifold when a partial vacuum exists, the air expands and comes into contact with the walls and absorbs fuel so that it actually becomes an explosive mixture when passing into the engine cylinders.

In the installations in which a plurality of actuators of either of the above mentioned types are employed for operating brake mechanisms of the vehicle, or vehicles, a very considerable amount of air would necessarily be admitted to the suction passage either during the application of the brakes or their release, according to the type of actuator, with the result that portions of this large quantity of air might not come in contact with the liquid fuel on the walls of the suction passage and such air would dilute the explosive mixture from the carburetor and stall the engine, if idling.

Our invention consists of a vacuum brake system comprising a plurality of power actuators operating substantially simultaneously, under the control of a single physically operable part, and so arranged that the air exhausted from each actuator (or a group of actuators) will be admitted to a different portion of the suction passage or passages from that to which the air exhausted from another actuator (or a group of actuators) is admitted. In case a single manifold is employed for a multi-cylinder engine, the suction connections from the separate actuators may be connected to the manifold at different and remote points. Where several manifolds and carburetors are used for supplying groups of cylinders to a multi-cylinder engine, the separate suction connections will be made conveniently to different manifolds at one or more points in each manifold. The immediate effect of this construction is to admit the unfuelized air withdrawn from the power actuator to different parts of the manifold or manifolds in order that most or all of the air will come in contact with the deposited liquid fuel to absorb the same and become fuelized, whether the withdrawal of air from the actuators is substantially simultaneous, as where they are the same type, or whether it is alternately, as where the actuators are of different types. Our invention in its preferred form, however, contemplates the employment in the same system of a plurality of power actuators, certain of which have the piston submerged in vacuum and certain of which have the piston submerged in atmosphere. Where this is the case, air will be admitted to the suction passage from the pressure-balanced actuators during the application of the brakes, and from the vacuum balanced actuators during the release of the brakes, so that air will be admitted at different times as well as at different points in the manifolding system. In this arrangement, sufficient time is ordinarily given to permit an accumulation of liquid fuel on the manifold walls before air is admitted to the same place during the cycle of applying and releasing the brakes and then reapplying and re-releasing. By our invention larger sizes or larger numbers of power actuators can be used for braking purposes without danger of stalling the engine while idling, and our invention is therefore particularly advantageous in equipping automotive vehicles with vacuum brake mechanism, especially in the case of trucks with relatively small engines, said trucks adapted to draw trailers. Our invention also comprises certain novel features of construction and combination of parts hereinafter fully described and particularly pointed out in the claims.

In the accompanying drawings, which illustrate several embodiments of the invention selected by us for purposes of illustration, Fig. 1 is a diagrammatic view of a vacuum brake system for automotive vehicles embodying our invention, including actuators of both pressure balanced and vacuum balanced types, separately connected to different manifolds of the engine.

Fig. 3 is a view similar to Fig. 1, showing one actuator located on the trailing vehicle for operating the brake mechanisms thereof.

Fig. 4 is a diagrammatic view of a modified installation in which the engine is provided with a single manifold.

Fig. 5 is a diagrammatic view, similar to Fig. 1, showing the valve mechanism for the actuators located in linkage between the foot lever and additional valve mechanism not operated by the power actuators, and the engine provided with a single manifold.

Figure 1:
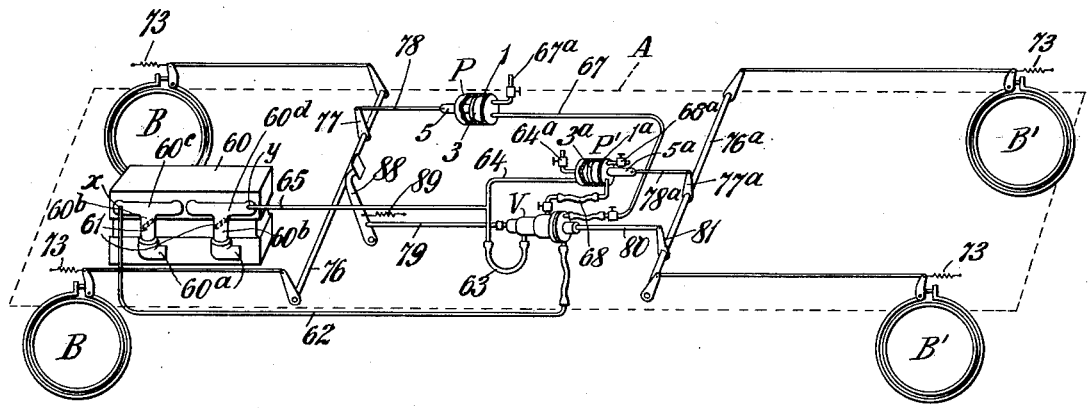
Figure 2:
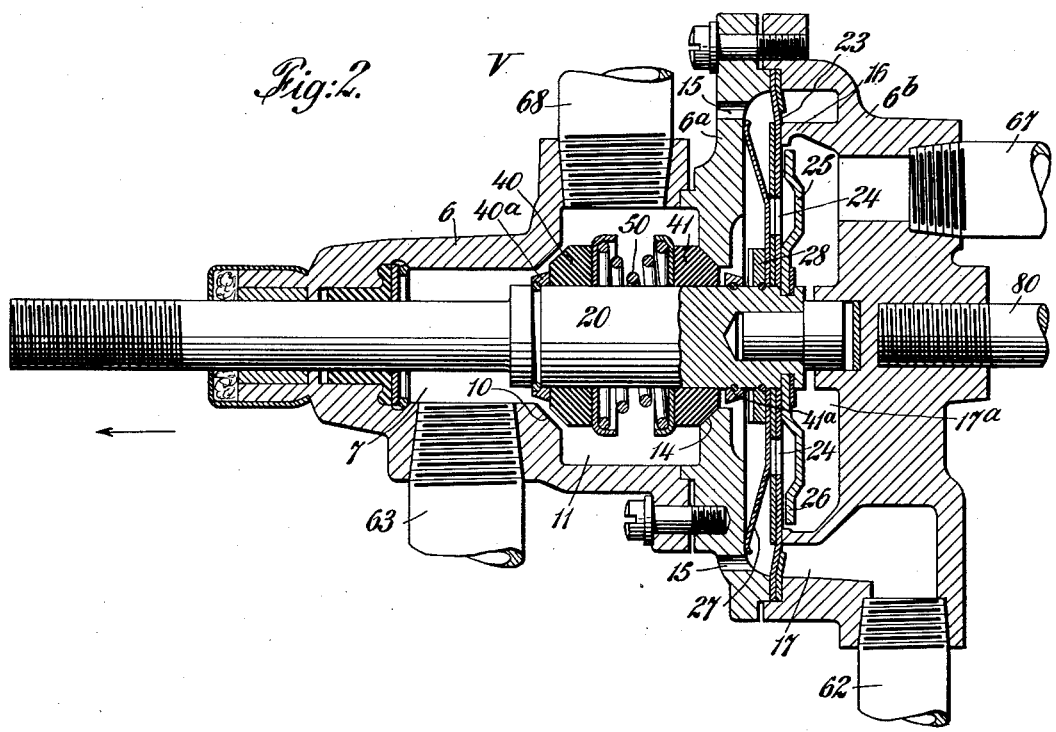
Fig. 2 is an enlarged sectional view of the controlling valve mechanism shown in Fig. 1.

Referring to the embodiment of our invention illustrated in Figs. 1 and 2, we have shown in Fig. 1, an installation on a motor vehicle having front and rear wheel brakes operated by separate power actuators, one of which is of the pressure balanced type, and the other of the vacuum balanced type, the suction pipes for which are independently connected to separate intake manifolds with which the engine is provided. In this figure the dotted lines, at A, represent the motor vehicle. B, B, represent the front wheel brakes connected for joint operation by a rock shaft, 76, and B', B', represent the rear wheel brake mechanisms, connected for joint operation by the rock shaft, 76a. P represents a pressure balanced power actuator comprising the cylinder, 1, open at one end, the piston, 3, having its piston rod, 5, connected in this instance by a link rod, 78, with an arm, 77, on the rock shaft, 76, for operating the front wheel brake mechanisms. P' represents the vacuum balanced power actuator, comprising a cylinder, 1a, closed at both ends, the piston 3a, having its piston rod, 5a, connected by link rod, 78a, with an arm, 77a, on a rock shaft, 76a, for operating the rear wheel brake mechanisms. V represents the controlling valve mechanism for simultaneously controlling both actuators. In the present instance we have shown and illustrated in detail, in Fig. 2, a specific form of valve mechanism covered by our former application for Letters Patent of the United States filed June 18th, 1929, and given Serial No. 371,763. This particular form of valve mechanism forms no part of our present invention and will be described only so far as may be necessary to an understanding of its operation. The valve casing comprises in this instance three sections, indicated at 6, 6a, and 6b, connected together in any desired manner. The section, 6, contains a suction chamber, 7, communicating with the valve chamber through a valve seat, 10. A valve actuating part, 20, extends through the valve chamber, 11, and the valve seats, 10 and 14, and carries the suction valve, 40, and air inlet valve, 41, which are normally pressed toward their seats by an intermediate spring, 50. These valves are preferably of molded cork or rubber, or cork composition, and sealingly engage the part, 20, which is provided with oppositely disposed collars, 40a, and 41a, so arranged that when the part, 20, is moved in either direction, it will open one of the valves after permitting the other to close, while both valves may be seated at the same time. The chamber, 7, is provided with an aperture to receive a suction pipe, indicated at 63, and the valve chamber, 11, is provided with an aperture to receive a pipe, 68, for connecting it with the cylinder, 1a, of the power actuator, P' in rear of the piston therein, portions of the pipe, 68, and of the suction pipe, 63, being flexible to accommodate the longitudinal movement of the valve mechanism. Between the sections, 6a and 6b, the edges of a diaphragm, indicated at 23, are clamped, the said diaphragm having its central portion secured to the valve actuating part, 20, and normally engaging an annular seat, 16, within the part, 6b, which divides it into a central chamber 17a, and an annular suction chamber, indicated at 17. The diaphragm, 23, is also provided with air inlet apertures, 24. The valve actuating part is also provided within the central chamber, 17a, with a disc valve, indicated at 25, having an annular seat, 26, and adapted to seat on the diaphragm, 23, but normally held unseated in the released position of the parts shown in Fig. 2, while the diaphragm is held seated on the seat, 16, in this instance by a spring spider, indicated at 27. The suction chamber, 17, is connected with a suction pipe, indicated at 62, and a central chamber, 17a, is connected by a pipe, 67, with the cylinder, 1, of the power actuator, P, forward of the piston therein. This valve mechanism is located in linkage between the brake pedal lever, indicated at 88, and certain of the brake mechanisms, in this instance the rear wheel brake mechanisms, B', and we have shown the pedal lever connected by link, indicated at 79, with the valve actuating part, 20, while the valve casing is connected by a link rod, 80, with an arm, 81, on the rock shaft 76a. If desired, the pedal lever can also be provided with the usual retracting spring, indicated at 89.

In Fig. 1, the internal combustion engine for driving the vehicle is indicated at 60, and is provided with two intake manifolds, 60c and 60d, each of which is connected with the usual carburetor, indicated at 60a, by a vertical passage, 60b the usual throttle valve, indicated at 61, being interposed between each carburetor, and the cylinders of the engine, supplied by the manifold connected therewith, so that when the throttle valves are closed, a partial vacuum will exist in that portion of each suction passage between the throttle valve therefor and the engine cylinders. At one point, x, preferably at one end of one of the manifolds, as 60c, we connect the suction pipe, 62, for the power actuator, P, which extends to the suction chamber, 17 of the valve mechanism. At another point, y, preferably at the opposite end of the other manifold, 60d, we connect the suction pipe, 65, for the power actuator, P', which is connected by the branch suction pipe, 63, with the suction chamber, 7, of the valve mechanism, and is also connected by a branch pipe, 64, with the forward end of the cylinder, 1a, of the vacuum balanced power actuator, P'.

The valve mechanism being in the released position shown in Fig. 2, it will be seen that since the suction valve, 40, is held in open position, the rear end of the cylinder, 1a, will likewise be connected with suction, and as the diaphragm, 23, is seated, cutting off suction from the closed end of cylinder, 1, and the disc valve, 25, is unseated, the cylinder, 1, will be connected with atmosphere through the apertures, 24, in the diaphragm and the air inlet apertures, 15.

When the engine is running and the parts are in the released position, shown in Figs. 1 and 2, the forward end of the cylinder, 1a, of the actuator, P', will be exhausted, and the rear end will likewise be exhausted through the valve mechanism and pipe, 63, the air therefrom being discharged into the intake manifold, 60d, at the point, y. The suction pipe, 62, will be likewise exhausted back to the suction passage, 17, of the valve mechanism, and the air will be discharged into the other intake manifold, 60c, at the point, x.

To apply the brakes, the operator will depress the pedal lever and move the valve actuating part, 20, in the direction of the arrow, Fig. 2, so as to seat the suction valve, 40, and the disc valve, 25, and thereafter open the air inlet valve, 41, and unseat the diaphragm, 23. The opening of the valve, 41, will admit air to the cylinder, 1a, of the vacuum balanced actuator, P', in rear of its piston, and effect a forward movement of the piston to apply the rear wheel brakes, B', without admitting any appreciable quantity of air to the manifold, 60d, at point, y. Simultaneously the unseating of the diaphragm, 23, will connect the cylinder, 1, of the pressure balanced actuator, P, forward of its piston, with the suction pipe, 62, and the air will be exhausted from cylinder, 1, forward of the piston to effect a movement of the piston, 3, to apply the front wheel brakes. This air will be admitted to the manifold, 60c, at the point, x, and will be sucked into the adjacent cylinders during their suction stroke, and will absorb the collected liquid fuel on the walls of the portion of the manifold through which the air passes en route to the engine cylinders, and will not come in contact with the liquid fuel on the walls of the other manifold, 60d, and will not interfere with the operation of the engine, or stall it if idling. It will be understood that the valve mechanism has the usual "follow up" operation. The brakes will be applied with continually increasing power so long as the forward movement of the pedal lever continues and the valve, 41, and diaphragm, 23, are held unseated, until the maximum power of the actuator is attained. If, however, the operator stops the forward movement of the pedal at any intermediate point, the valve casing will be moved forward by its connection with the rock shaft 76a, so as to close the valve, 41, and seat the diaphragm, 23, without unseating the suction valve, 40, and disc valve, 25. This will hold the brakes as applied, and in this manner the brakes may be applied to any desired extent under the control of the pedal lever.

It will also be understood that the diaphragm and disc valve, during the power stroke of the actuator, P, will be subjected to the same differentials of fluid pressures as the piston of that actuator, which will constitute a reactionary force against the forward movement of the pedal. This gradually increasing reactionary force must be sustained by the foot of the operator and serves to apprise him as to the extent to which the brakes are being applied.

The valve actuating part, 20, is also provided with a stop collar, 28, which can be brought into contact with the casing member, 6a, by a further forward movement of the pedal, 88, so that the operator can add his physical force to the brake mechanisms with which the valve linkage is connected, in this instance, the rear wheel brake mechanisms, after the power actuator has exerted its full power, and may apply those brake mechanisms by physical force alone in case of failure of power.

When it is desired to release the brake mechanisms after they have been applied by power, the operator, by releasing the pedal lever, 88, may permit the seating of valve, 41, and diaphragm, 23, and the unseating of suction valve, 40, and disc valve, 25. This will reconnect the rear end of the vacuum balanced actuator cylinder, 1a, with its suction connection to point, y, of manifold, 60d, to withdraw the air previously admitted, and will simultaneously admit air to the forward end of the pressure balanced actuator cylinder, 1. The air admitted to manifold, 60d, at y, will be sucked into the adjacent engine cylinders and will fuelize itself by absorbing liquid from the walls of that portion of the manifold through which it passes, which portion has not been swept by other air and will not stall the engine if idling, and during this time liquid fuel is collecting on the walls of the other manifold, 60c, adjacent to the point, x.

Therefore, in the brake system illustrated in Figs. 1 and 2, air is withdrawn from the actuators at different times during this cycle of applying and releasing the brakes and is delivered into the suction passages of the engine, i. e., the separate manifolds at separate points, so that the quantity of air admitted at each point, x and y, which is about one half the total air, will be enriched in passing to the adjacent cylinders and will not sweep all of the manifold, and therefore fuel will remain adjacent to the other point while fuel will be redeposited at the first point before air is again admitted. The wide separation of the points, x and y, will also insure the normal operation of certain of the engine cylinders even though air should be admitted at either of said points at such times or in such quantities that it would not be fully fuelized before reaching the other cylinders of the engine. This permits of the use of actuator cylinders of larger capacity than would otherwise be possible where the air exhausted at different times from the power actuators is discharged at one point into the suction passage. It will be understood that the valve mechanism shown in Figs. 1 and 2 may be made to control two or more actuators of each of the types shown, if that is found to be desirable. Thus, in Fig. 1 we have shown the actuators, P and P', provided with branch pipes, indicated at 68a, 64a and 67a, which may be connected to the corresponding parts of additional actuators, and are shown in the drawings as provided with cut-off cocks to be closed when other actuators are not so connected.

It will be understood that our invention is applicable to brake systems whether the actuators and the brake mechanisms operated thereby are located on one vehicle or on separate vehicles as the tractor and trailer. In Fig. 3, for example, we have illustrated the system shown in Figs. 1 and 2 applied to tractor and trailer, the corresponding parts being given the same reference numerals with the addition of 100, to avoid repetition. In this figure, A', represents the tractor vehicle, and A2, represents the trailing vehicle. In this instance the pressure operated power actuator, P2, is located on the trailer, and operatively connected with brake mechanisms, B2, B2, therefor, while the vacuum balanced actuator, P3, is located on the main vehicle and operatively connected with the brake mechanisms, B3, B3, therefor. The valve mechanism, V2, controlling both actuators, is of the kind shown in Fig. 2, and the suction pipes, 165, 162, are connected in this instance at the points, $y$ and $x$, respectively, at opposite ends of the separate manifolds, 160c and 160d, of the internal combustion engine. The operation will be exactly the same as that described with reference to Figs. 1 and 2, and need not be repeated.

In Fig. 4, in which the parts corresponding with those shown in Figs. 1 and 2 are given the same reference numerals with the addition of 200, we have illustrated the same installation as that previously described, with reference to those figures, except that the engine, 260, is provided with a single manifold, 260c, the suction pipe, 262, being connected at $x$, to said manifold, adjacent to one end thereof, while the suction pipe, 265, is connected at $y$, to the other end of said manifold. This arrangement insures a sufficient separation of the points $x$ and $y$, and it will be obvious that air admitted at either point cannot interfere with the operation of all the cylinders connected with the manifold, and cannot stall the motor if idling, even if the air admitted to certain of the cylinders is not fully fuelized.

It will also be understood that our improved brake system may be embodied in a vehicle, with the valve mechanism located in linkage between the pedal lever and brake mechanism, not operated by either of the power actuators.

In Fig. 5 in which the parts corresponding with those shown in Figs. 1 and 2 are given the same reference numerals, with the addition of 300, we have illustrated diagrammatically, such an embodiment. In this instance the power actuators, P4, and P5, are connected respectively with brake mechanisms, B4 and B5, being the front wheel and intermediate wheel brake mechanisms. B6, B6, represent additional brake mechanisms applied to certain wheels of the vehicle, which might be the same wheels to which brakes, B5, are applied, or as shown, the extreme rear wheels of the vehicle. The controlling valve mechanism, V4, is constructed as illustrated in Fig. 2, and controls the power actuators, P4, and P5, in exactly the same manner as previously described with reference to Figs. 1 and 2. In this instance, however, the pedal lever, 388, is connected by a link, 379, with the valve actuating parts of the valve mechanism, while the valve casing is connected by a link, 380, with an arm, 381, on a rock shaft, 376b, operative $y$ connected with the brake mechanisms, B6. In this case the physical force which the operator applies to the pedal lever, to overcome the reactionary force of the valve mechanism or to supplement the power of the actuators, or to apply brake mechanisms by physical force alone, will be applied only to the brake mechanisms, B6, B6. In this instance, as in Fig. 4, the suction pipes, 365 and 362, are connected at separated points, $y$ and $x$, respectively, at opposite ends of the single intake manifold, 360c, and air will be admitted at one of these points only when the brakes are applied by power and at the other of said points when the brakes are released, as previously described.

What we claim and desire to secure by Letters Patent is:—

1. In a vacuum brake system for automotive vehicles provided with an internal combustion engine having throttle-controlled suction means for supplying combustible mixture to the engine cylinders, the combination of a plurality of power actuators each comprising a cylinder and piston, and means for connecting said actuators with brake mechanism, certain of said actuators having the piston vacuum balanced, and certain of said actuators having the piston pressure balanced, when in released position, valve mechanism connected with all of said actuators, a physically operable part for operating said valve mechanism to effect a power stroke of all of said actuators substantially simultaneously, said valve mechanism being provided with separate suction connections for the suction balanced and pressure balanced actuators, each connected with portions of the said suction means at widely separated points therein, so that the air exhausted from actuators of each type will be admitted to a portion of said suction means supplying a portion only of the engine cylinders, and at a different time from the admission of air exhausted from actuators of the other type.

2. In a vacuum brake system for automotive vehicles provided with an internal combustion engine having a plurality of throttle-controlled suction means for supplying combustible mixture to different groups of cylinders of the engine, the combination of a plurality of power actuators, each comprising a cylinder and piston, means for connecting each of said actuators with brake mechanism, certain of said actuators having the piston vacuum balanced and certain of said actuators having the piston pressure balanced when in released position, controlling valve mechanism connected with all of said actuators, a physically operable part for operating said valve mechanism to effect a power stroke of, and to release all of, said actuators substantially simultaneously, said valve mechanism having a suction connection for vacuum balanced actuators connected to one of said suction means, and an independent suction connection for pressure balanced actuators connected to another of said suction means.

3. In a vacuum system for automotive vehicles provided with an internal combustion engine having separate intake manifolds for different groups of engine cylinders, a carburetor and throttle-controlled passage therefrom for each manifold, the combination of a plurality of power actuators, each comprising a cylinder and piston, certain of said actuators having the piston vacuum balanced and certain of said actuators having the piston pressure balanced when in the released position, means for connecting each of said actuators with brake mechanism, controlling valve mechanism for said actuators, a physically operable part connected with said valve mechanism for effecting a power stroke of and releasing all of said actuators substantially simultaneously, said valve mechanism having a suction connection for suction balanced actuators connected to one manifold, and an independent suction connection for pressure balanced actuators connected with another manifold.

4. In a vacuum system for automotive vehicles provided with an internal combustion engine having separate intake manifolds for different groups of engine cylinders, a carburetor and throttle-controlled passage therefrom for each manifold, the combination of a plurality of power actuators, each comprising a cylinder and piston, one of said actuators having its piston vacuum balanced and another of said actuators having its piston pressure balanced when in the released position, means for connecting each of said actuators with brake mechanism, controlling valve mechanism for said actuators, a physically operable part connected with said valve mechanism for effecting a power stroke of and releasing all of said actuators, substantially simultaneously, said valve mechanism having a suction connection for the suction balanced actuator connected to one manifold, at a point adjacent to one end thereof, and an independent suction connection for the pressure balanced actuator connected to another of said manifolds adjacent to one end thereof.

5. In a vacuum system for automotive vehicles provided with an internal combustion engine having separate intake manifolds for different groups of engine cylinders, a carburetor and throttle-controlled passage therefrom for each manifold, the combination of a plurality of power actuators, each comprising a cylinder and piston, one of said actuators having its piston vacuum balanced and another of said actuators having its piston pressure balanced when in the released position, means for connecting each of said actuators with brake mechanism, controlling valve mechanism for said actuators, a physically operable part connected with said valve mechanism for effecting a power stroke of and releasing all of said actuators, substantially simultaneously, said valve mechanism having a suction connection for the suction balanced actuator connected to the manifold, at a point adjacent to the end thereof furthest from the adjacent manifold, and an independent suction connection for the pressure balanced actuator connected to another of said manifolds adjacent to the end thereof furthest from the point of connection of the first mentioned suction connection with its manifold.

6. In a vacuum brake system for automotive vehicles provided with an internal combustion engine having throttle-controlled suction means for supplying combustible mixture to the engine cylinders, the combination with a plurality of power actuators each comprising a cylinder and a piston therein, means for connecting said actuators with brake mechanism, independent suction connections for said actuators, higher fluid pressure connections for said actuators, controlling valve mechanism for said actuators, and a physically operable part connected with said valve mechanism for securing the substantially simultaneous operation of said actuators, certain of said actuators being vacuum balanced when in released position, and having the portion of the cylinder thereof forward of the piston connected at all times with the said suction means, and a portion of the cylinder thereof in rear of the piston connected with the controlling valve mechanism to admit higher pressure fluid to apply the brake mechanism and withdraw it to release the brake mechanism, the independent suction connections for said actuator being independently connected with said suction means at different and separated points therein.

7. In a vacuum brake system for automotive vehicles provided with an internal combustion engine having throttle-controlled suction means for supplying combustible mixture to the engine cylinders, the combination with a plurality of power actuators each comprising a cylinder and a piston therein, means for connecting said actuators with brake mechanism, independent suction connections for said actuators, higher fluid pressure connections for said actuators, controlling valve mechanism for said actuators, and a physically operable part connected with said valve mechanism for securing the substantially simultaneous operation of said actuators, certain of said actuators being vacuum balanced when in released position, and having the portion of the cylinder thereof forward of the piston connected at all times with the said suction means, and a portion of the cylinder thereof in rear of the piston connected with the controlling valve mechanism to admit higher pressure fluid to apply the brake mechanism and withdraw it to release the brake mechanism, the independent suction connections for said actuators being connected with separated portions of said suction means supplying different cylinders of the engine.

8. In a vacuum brake system for automotive vehicles provided with an internal combustion engine having throttle-controlled suction means for supplying combustible mixture to the engine cylinders, the combination with a plurality of power actuators each comprising a cylinder and a piston therein, means for connecting said actuators with brake mechanism, independent suction connections for said actuators, higher fluid pressure connections for said actuators, controlling valve mechanism for said actuators, and a physically operable part connected with said valve mechanism for securing the substantially simultaneous operation of said actuators, certain of said actuators being vacuum balanced when in released position, and having the portion of the cylinder thereof forward of the piston connected at all times with the said suction means, and a portion of the cylinder thereof in rear of the piston connected with the controlling valve mechanism to admit higher pressure fluid to apply the brake mechanism and withdraw it to release the brake mechanism, said suction means for the engine comprising a plurality of separate manifolds having independent carburetors, said independent suction connections for said actuators being each connected independently with a differet manifold.

In testimony whereof we affix our signatures.

CALEB S. BRAGG.
VICTOR W. KLIESRATH.